US012589677B2

(12) United States Patent
  Gempel

(10) Patent No.: US 12,589,677 B2
(45) Date of Patent: Mar. 31, 2026

(54) METHOD FOR OPERATING AN ADJUSTMENT SYSTEM FOR AN INTERIOR OF A MOTOR VEHICLE

(71) Applicant: Brose Fahrzeugteile SE & Co. Kommanditgesellschaft, Bamberg, Bamberg (DE)

(72) Inventor: Matthias Gempel, Bamberg (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 167 days.

(21) Appl. No.: 18/692,034

(22) PCT Filed: Sep. 13, 2022

(86) PCT No.: PCT/EP2022/075352
  § 371 (c)(1),
  (2) Date: Mar. 14, 2024

(87) PCT Pub. No.: WO2023/041506
  PCT Pub. Date: Mar. 23, 2023

(65) Prior Publication Data
  US 2024/0375554 A1    Nov. 14, 2024

(30) Foreign Application Priority Data
  Sep. 14, 2021    (DE) ..................... 10 2021 123 728.9

(51) Int. Cl.
  B60N 2/02      (2006.01)
  B60N 2/005     (2006.01)
  G06N 3/045     (2023.01)

(52) U.S. Cl.
  CPC ........... B60N 2/0272 (2023.08); G06N 3/045 (2023.01); B60N 2002/0055 (2013.01)

(58) Field of Classification Search
  CPC .......... B60N 2/0272; B60N 2002/0055; G06N 3/045
  (Continued)

(56) References Cited

U.S. PATENT DOCUMENTS 7,073,855 B2    7/2006  Wagner et al.
2016/0152163 A1*  6/2016  Strasdat ................... B60N 2/24
                                    296/64
  (Continued)

FOREIGN PATENT DOCUMENTS

DE    102006029206      4/2008
DE    102019209740      1/2021
  (Continued)

OTHER PUBLICATIONS

WO2019175292A1 English translation (Year: 2019).*
  (Continued)

*Primary Examiner* — Navid Z. Mehdizadeh
*Assistant Examiner* — Brian K Palmarchuk
(74) *Attorney, Agent, or Firm* — Pauly, DeVries Smith & Deffner LLC

(57)        ABSTRACT

A method for operating an adjustment system for an interior of a vehicle, wherein a collision-free adjustment path from an initial configuration to a final configuration is determined
  (Continued)

in a path planning routine by the control arrangement by way of intermediate configurations, wherein a collision check is performed for the intermediate configurations, in which the respective intermediate configuration is checked for the presence of a collision based on a kinematics model and a geometry model, wherein the collision-free adjustment path is generated based on the intermediate configurations and depending on the results of the collision check. A prediction of the presence of a collision is generated for the intermediate configurations by the control arrangement with the aid of a predetermined collision model based on a trained machine learning model and that the intermediate configurations are subjected to the collision check or rejected depending on the prediction of the collision check.

19 Claims, 4 Drawing Sheets

(58) Field of Classification Search
USPC .......................................................... 701/49
See application file for complete search history.

(56) References Cited

U.S. PATENT DOCUMENTS

| | | | |
|---|---|---|---|
| 2020/0276916 A1 | 9/2020 | Kieser et al. | |
| 2021/0086662 A1 | 3/2021 | Gempel et al. | |
| 2022/0114817 A1 * | 4/2022 | Gronau ..................... | G06T 7/70 |
| 2025/0304073 A1 * | 10/2025 | Giovanardi ........... | G01S 13/931 |

FOREIGN PATENT DOCUMENTS

| | | | | |
|---|---|---|---|---|
| EP | 3693137 | 8/2020 | | |
| WO | WO-2019175292 A1 * | 9/2019 | ........... | G01B 11/002 |
| WO | 2023041506 | 3/2023 | | |
| WO | WO-2024046623 A1 * | 3/2024 | ....... | B60R 21/01538 |

OTHER PUBLICATIONS

WO2024046623A1 English translation (Year: 2024).*
"German Search Report," for German Patent Application No. 102021123728.9 mailed Jul. 5, 2022 (19 pages), with English translation.
"International Search Report," for PCT Application No. PCT/EP2022/075352 mailed Feb. 20, 2023 (20 pages), with English translation.

* cited by examiner a)

b)

a)

b)

$$M_i = \begin{pmatrix} X_1 \\ X_2 \\ \vdots \\ X_n \end{pmatrix}$$

METHOD FOR OPERATING AN ADJUSTMENT SYSTEM FOR AN INTERIOR OF A MOTOR VEHICLE

CROSS-REFERENCE TO RELATED APPLICATIONS

This application is a national stage application under 35 U.S.C. 371 of International Patent Application Serial No. PCT/EP2022/075352, entitled "METHOD FOR OPERATING AN ADJUSTMENT SYSTEM FOR AN INTERIOR OF A MOTOR VEHICLE," filed Sep. 13, 2022, which claims priority from German Patent Application No. DE 10 2021 123 728.9, filed Sep. 14, 2021, the disclosure of which is incorporated herein by reference.

FIELD OF THE TECHNOLOGY

Various embodiments relate to a method for operating an adjustment system for an interior of a motor vehicle, a control arrangement for operating an adjustment system, a motor vehicle for performing such a method and a computer program product and a computer-readable medium.

BACKGROUND

To increase comfort, motor vehicles are equipped with adjustment systems that allow motorized adjustment of interior elements. Interior elements are understood to include seats, bench seats, consoles, operating elements, panels, screens, shelves, lighting elements, interior mirrors, trim parts or the like that are associated with the interior of the motor vehicle.

The operator of the motor vehicle can trigger a motorized adjustment manually, among other things, and in particular access pre-set configurations of the interior elements in which an automatic adjustment is to take place. Examples of such configurations are various seating positions such as upright seat backs, reclining positions with lowered seat backs or a conference configuration with the seating surfaces of multiple seats facing each other.

However, there is also a risk of collision with the motorized adjustment of the interior elements. A known method (DE 10 2019 209 740 A1) uses an interior sensor arrangement in order to ensure that the distance between the interior element and another object does not fall below a minimum distance during the adjustment.

However, the adjustment systems of modern motor vehicles, in particular also semi-autonomous or autonomous motor vehicles, can have a large number of adjustable interior elements that can be adjusted in a variety of configurations using complex adjustment kinematics. In addition to the risk of collision with objects and persons in the interior, the adjustment paths of various motorized adjustable interior elements can also overlap. Path planning for the adjustment can further increase the operating comfort of the adjustment systems, wherein the operator is given the option of accessing different configurations in a simple and safe manner.

SUMMARY

The intermediate configurations of the initial configuration and the final configuration can be considered in the path planning and that the intermediate configurations are subjected to a collision check. In the collision check, a kinematics model of the adjustment kinematics and a geometry model of the interior elements are used to determine whether the respective intermediate configuration can be used to generate a collision-free adjustment path or whether it is collision-prone.

One challenge here, however, is limiting the computational effort associated with the collision check since path planning for a complex adjustment system can require the collision check of a large number of intermediate configurations.

Various embodiments are based on the problem of designing and further developing a method for operating an adjustment system in such a way that the performance of the adjustment is further optimized.

The above problem is solved in a method for operating an adjustment system of a motor vehicle according to various embodiments provided herein.

One aspect is that, before the actual collision check, it is possible to estimate in a prediction whether the respective intermediate configuration is likely to be collision-free or collision-prone. The estimation is performed with the aid of a collision estimation model based on a trained machine learning model and is used to preselect the intermediate configurations to be fed to the collision check.

Specifically, it is proposed that a prediction of the presence of a collision can be generated for the intermediate configurations by means of the control arrangement with the aid of a predetermined collision estimation model based on a trained machine learning model and that the intermediate configurations are subjected to the collision check or rejected depending on the prediction in various embodiments.

The collision check is performed here specifically for intermediate configurations with a positive prediction. Intermediate configurations with a negative prediction, on the other hand, can be rejected in order to save computing time. By reducing the computational effort, it is possible in particular to perform path planning with a high resolution in the configuration space without significant time delays in the adjustment.

It can be advantageous to use the collision estimation model in some embodiments, according to which the intermediate configurations are generated based on a probabilistic path planning method. The probabilistically generated intermediate configurations can be effectively preselected by way of the collision estimation model.

Various embodiments include using a trained neural network for the collision estimation model, wherein the prediction of the possible collision can be reliably implemented.

According to various embodiments, the collision estimation model can, among other things, output a collision probability and/or a distance measurement, which are taken into account in the prediction. In particular, according to various embodiments, threshold values are used for this in order to select the intermediate configurations.

According to various embodiments, the collision estimation model can also be used to select an intermediate configuration, for example an intermediate configuration that is particularly promising in terms of collision-free operation. In this way, the collision estimation model can significantly facilitate path planning.

In various embodiments, a training step is provided with which the collision estimation model is trained with the aid of a training data set. The training data set can be generated in a simple manner by performing the collision check for many intermediate configurations.

It is also conceivable that the method is used for different adjustment systems with different interior elements. According to some embodiments, a selection is made from multiple trained machine learning models for different arrangements of interior elements so that a collision estimation model that is optimized for the respective adjustment system can be used.

In the actual collision check, objects and/or persons in the interior can also be included, which is the subject of some embodiments.

According to various embodiments, a control arrangement for operating an adjustment system for an interior of a motor vehicle is provided. The control arrangement performs the path planning routine referred to and implements the control in the adjustment routine according to the determined collision-free adjustment path. Reference is made to all statements relating to the method according to the proposal.

According to various embodiments, a motor vehicle for performing the method according to the proposal is provided. Reference is also made to all the statements relating to the method according to the proposal.

According to various embodiments, a computer program product for the control arrangement according to the proposal is provided. Reference is also made to all statements relating to the further teachings.

According to various embodiments, a computer-readable medium on which the computer program according to the proposal is stored is provided.

Various embodiments provide a method for operating an adjustment system for an interior of a motor vehicle, wherein the adjustment system has motorized adjustable interior elements, which can be adjusted between different configurations by means of respective drive arrangements having actuators by way of adjustment kinematics, wherein a collision-free adjustment path from an initial configuration to a final configuration is determined in a path planning routine by means of the control arrangement by way of intermediate configurations, wherein a collision check is performed for the intermediate configurations, in which the respective intermediate configuration is checked for the presence of a collision based on a kinematics model of the adjustment kinematics and a geometry model of the interior elements, wherein the collision-free adjustment path is generated based on the intermediate configurations and depending on the results of the collision check, wherein the control arrangement controls the drive arrangements in an adjustment routine in order to adjust the motorized adjustable interior elements by way of the adjustment kinematics according to the collision-free adjustment path, wherein a prediction of the presence of a collision is generated for the intermediate configurations by means of the control arrangement with the aid of a predetermined collision estimation model based on a trained machine learning model and wherein the intermediate configurations are subjected to the collision check or rejected depending on the prediction.

In various embodiments, the intermediate configurations are generated based on a probabilistic path planning method. In some embodiments, the intermediate configurations correspond to probabilistically generated nodes of the path planning method and/or lie on connecting paths of the probabilistically generated nodes.

In various embodiments, the intermediate configurations are determined on the basis of a rapidly exploring random tree method and/or probabilistic roadmap method.

In various embodiments, the collision estimation mode is based on a trained neural network.

In various embodiments, a collision probability of the intermediate configuration is determined with the aid of the collision estimation model and/or wherein a distance measurement of interior elements is determined for the intermediate configuration with the aid of the collision estimation model.

In various embodiments, at least one threshold value is predetermined for the collision probability and/or the distance measurement, and wherein the respective intermediate configuration is subjected to the collision check 13 or rejected depending on whether the at least one threshold value is exceeded. In some embodiments, respective threshold values are provided for different sections of the configuration space.

In various embodiments, multiple intermediate configurations are generated, in particular in a predetermined section of the configuration space and at least one of the intermediate configurations is selected with the aid of the collision estimation model for the collision check. In some embodiments, the at least one intermediate configuration is selected on the basis of an optimization of the collision probability and/or the distance measurement.

In various embodiments, the collision estimation model is trained in a training step by way of a training data set. In some embodiments, the training step is performed before the adjustment system is commissioned or during the operation of the adjustment system.

In various embodiments, the training data set is generated for a predetermined compilation of intermediate configurations on the basis of the performance of the collision check.

In various embodiments, the interior elements arranged in the interior are identified in an identification routine by means of the control arrangement, in particular by means of a detection of the interior elements by way of an interior sensor arrangement and wherein the collision estimation mode is selected by means of the control unit from multiple trained machine learning models for different arrangements of interior elements depending on the identification that has taken place.

In various embodiments, in the collision check a check is performed for a collision of the interior elements with each other and for a collision of the interior elements with objects and/or persons in the interior. In some embodiments, the objects and/or persons in the interior are detected by means of an interior space arrangement.

Various embodiments provide a control arrangement for operating an adjustment system for an interior of a motor vehicle, wherein the adjustment system has motorized adjustable interior elements, which can be adjusted between different configurations by means of respective drive arrangements having actuators by way of adjustment kinematics, wherein the control arrangement determines in a path planning routine a collision-free adjustment path from an initial configuration to a final configuration by way of intermediate configurations, wherein the control arrangement performs for the intermediate configurations a collision check in which the respective intermediate configuration is checked for the presence of a collision based on a kinematics model of the adjustment kinematics and a geometry model of the interior elements, wherein the control arrangement generates the collision-free adjustment path based on the intermediate configurations and depending on the results of the collision check, wherein the control arrangement controls the drive arrangements in an adjustment routine in order to adjust the motorized adjustable interior elements by way of the adjustment kinematics according to the collision-free adjustment path, wherein the control arrangement with the aid of a predetermined collision estimation model based on a trained machine learning model generates a prediction of the presence of a collision for the intermediate configurations and wherein the control arrangement subjects the intermediate configurations to the collision check or rejects them depending on the prediction of the collision check.

Various embodiments provide a motor vehicle for performing a method as described herein.

Various embodiments provide a computer program product, comprising instructions which cause a control arrangement as described herein to determine in a path planning routine a collision-free adjustment path from an initial configuration to a final configuration by way of intermediate configurations, wherein the control arrangement performs for the intermediate configurations a collision check in which the respective intermediate configuration is checked for the presence of a collision based on a kinematics model of the adjustment kinematics and a geometry model of the interior elements, wherein the control arrangement generates the collision-free adjustment path based on the intermediate configurations and depending on the results of the collision check, wherein the control arrangement controls the drive arrangements in an adjustment routine in order to adjust the motorized adjustable interior elements by way of the adjustment kinematics according to the collision-free adjustment path, wherein the control arrangement generates a prediction of the presence of a collision for the intermediate configurations with the aid of a predetermined collision estimation model based on a trained machine learning model and wherein the control arrangement subjects the intermediate configurations to the collision check or rejects them depending on the prediction.

Various embodiments provide a computer-readable medium on which the computer program as described herein is stored.

BRIEF DESCRIPTION OF THE DRAWINGS

In the following, various aspects are explained in more detail with reference to a drawing which merely shows exemplary embodiments. In the drawing.

DETAILED DESCRIPTION

Various embodiments relate to a method for operating an adjustment system 1 for an interior 2 of a motor vehicle 3. In the present case, the interior 2 is to be understood as the inner section of the motor vehicle 3, which has the passenger compartment.

In this case, various interior elements of the motor vehicle 3 which can basically be static or adjustable are assigned to the interior 2. Static interior elements are arranged immovably relative to the rest of the motor vehicle 3. Adjustable interior elements, on the other hand, are configured so as to be brought into at least two different positions relative to the rest of the motor vehicle 3. In principle, the adjustable interior elements can be adjusted by motor and/or manually.

Figure 1:
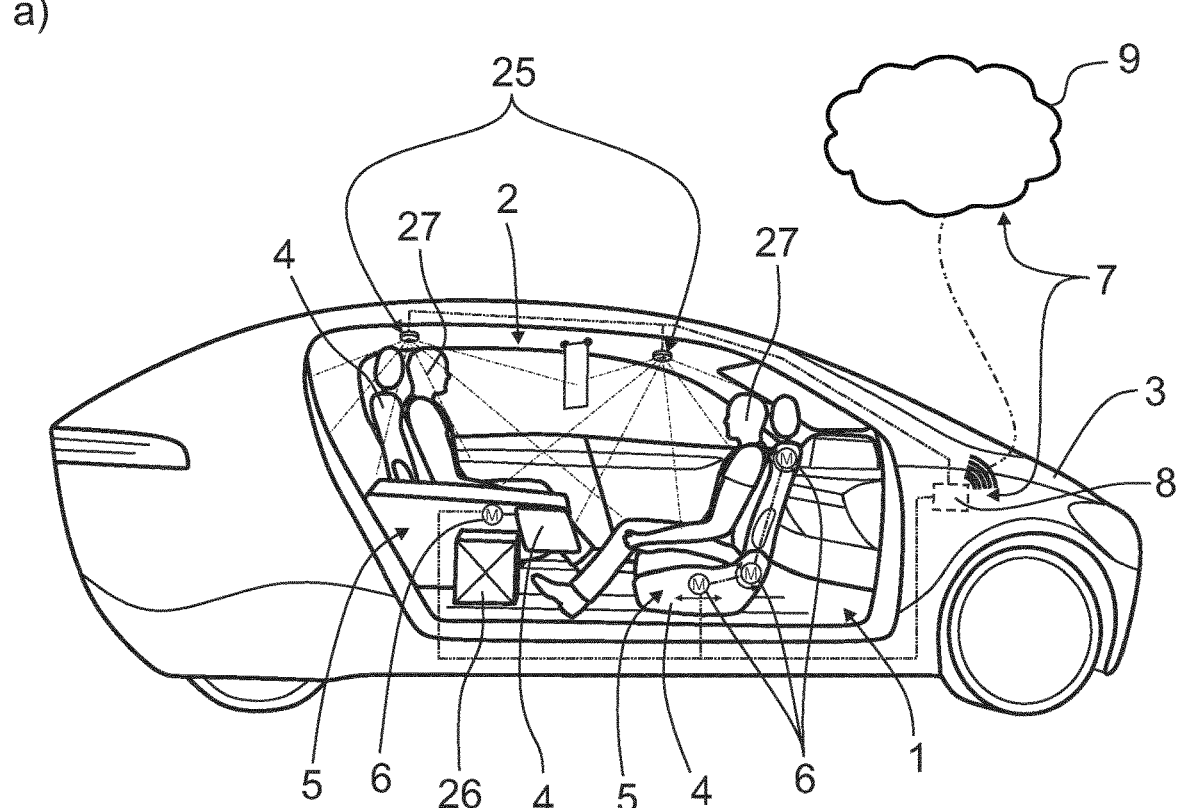
FIG. 1 shows a perspective view of a motor vehicle according to the proposal for performing the method according to the proposal in a) a first configuration and b) a second configuration of the adjustment system.
Figure 1:
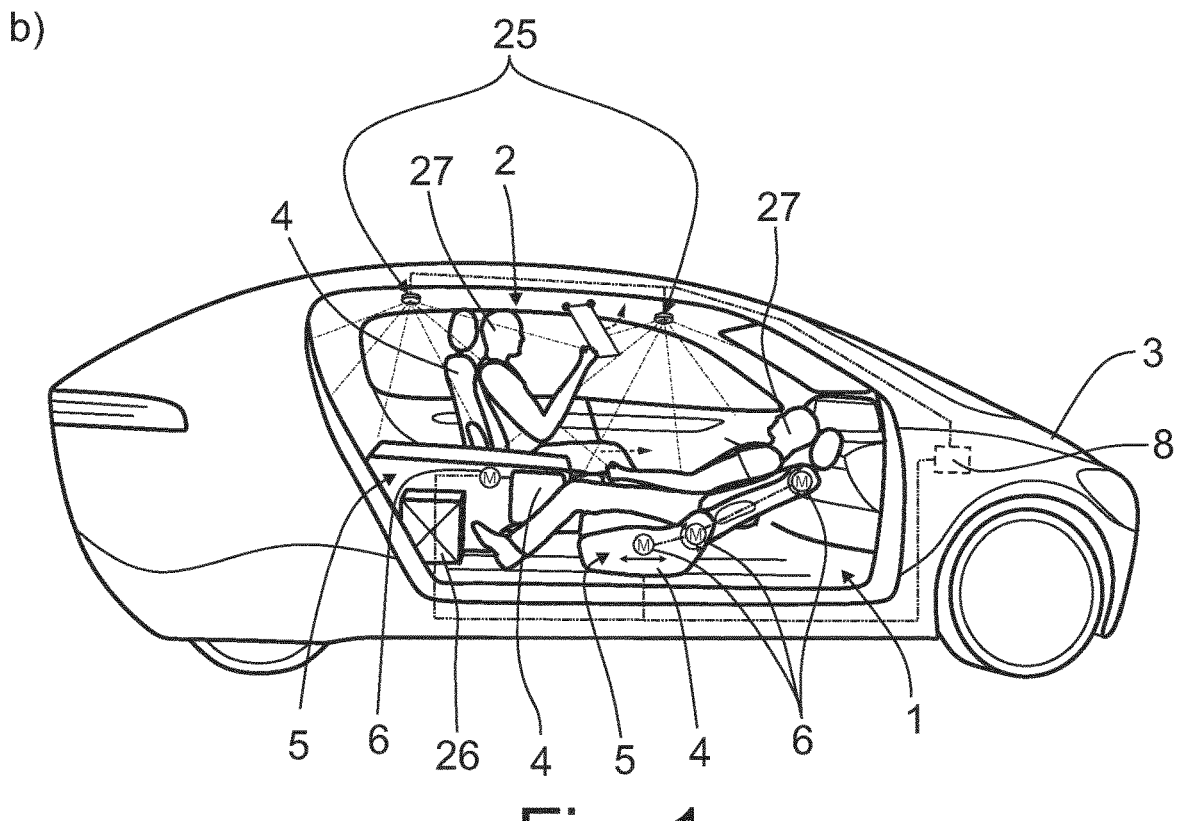

The adjustment system 1 in this case has motorized adjustable interior elements 4, which can be adjusted between different configurations by means of respective drive arrangements 5 having actuators 6 by way of an adjustment kinematics. The motorized adjustable interior elements 4 shown in FIG. 1 are, for example, seats and a motorized adjustable table. For further possible additional or alternative configurations of the interior elements, reference is made to the introductory statements.

The actuators 6 are generally electrically controllable actuators, for example rotary electric motors and/or electric linear motors, magnetic, pneumatic and/or hydraulic actuators or the like, which cause a motorized adjustment of the motorized adjustable interior element 4 by way of a drive movement. Depending on the design of the motorized adjustable interior element 4, the respective drive arrangements 5 can have one actuator 6 or multiple actuators 6. Multiple actuators 6 are provided in particular so as to realize an adjustment in different degrees of freedom of the motorized adjustable interior element 4, for example a longitudinal adjustment, a height adjustment and a swivel adjustment. It is also possible to provide multiple actuators 6 for one degree of freedom.

The adjustment kinematics are understood to be the components of the adjustment system 1 and in particular the adjustable interior elements that enable the adjustable interior elements to move, for example joints, hinges, guide rails or the like. In a particularly relevant embodiment here, the adjustment kinematics in principle allow mutual overlapping of the motorized adjustable interior elements 4 during the adjustment movement, so that the coordination of the adjustment routine is of particular importance. In principle, it is possible for the motorized adjustable interior elements 4 to collide with each other during an adjustment of the motorized adjustable interior elements 4 or also for motorized adjustable interior elements 4 to collide with other, for example static, interior elements.

Figure 2:
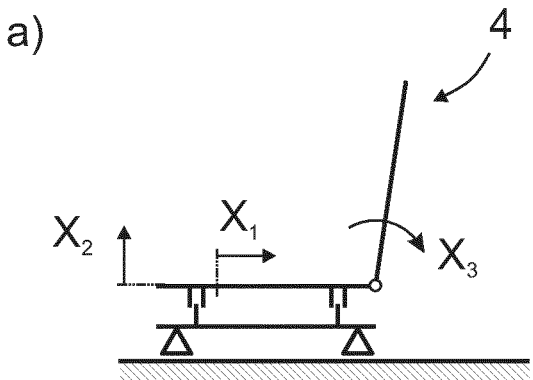
FIG. 2 shows a) a schematic representation of a motorized adjustable interior element, b) a diagram with degrees of freedom and configurations.
Figure 2:
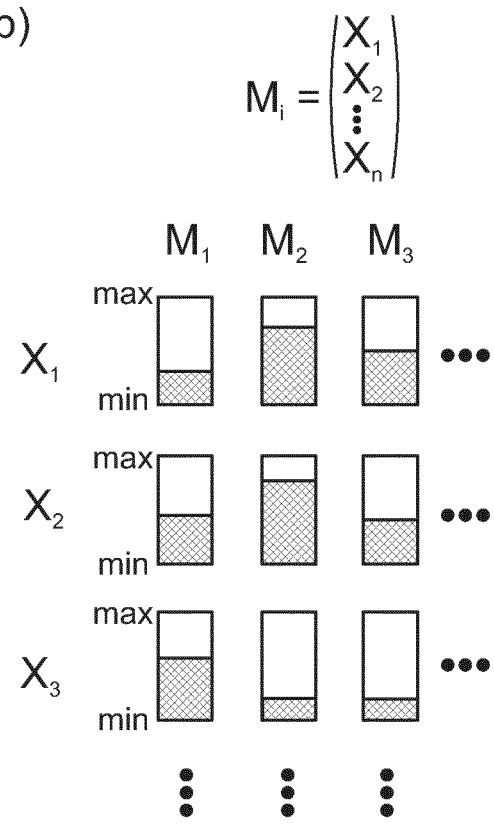

The adjustable interior elements can be brought into various configurations $M_i$ by way of the adjustment kinematics. FIG. 2 shows by way of example three degrees of freedom $X_1$, $X_2$, $X_3$ of a motorized adjustable interior element 4 for the configurations $M_1$, $M_2$, $M_3$. Here, for example, $X_1$ represents the position of the longitudinal adjustment of a seat, $X_2$ the position of the height adjustment of the seat and $X_3$ the position, in this case the swiveling angle, of the backrest relative to the rest of the seat. Alternative or additional degrees of freedom are conceivable.

The configuration $M_i$ here indicates the total of the positions of the degrees of freedom $X_1 \ldots X_n$ of the motorized adjustable interior elements 4. In so doing, the degrees of freedom $X_1 \ldots X_n$ can be continuously variable and/or at least partially assume only discrete values. In the latter case, for example, only certain discrete positions of the motorized adjustable interior element 4 can be achieved, for example due to a mechanical ratchet or the like. In various embodiments, the drive arrangements 5 are self-locking for at least some of the degrees of freedom, so that the configuration $M_i$ is maintained even without controlling the drive arrangement 5. FIG. 2b) shows different configurations $M_1$, $M_2 \ldots M_n$, wherein the positions of the degrees of freedom $X_1$, $X_2 \ldots X_n$ can vary schematically from a minimum value to a maximum value. The positions of the degrees of freedom $X_1$, $X_2 \ldots X_n$ can be characterized on the basis of characteristic values, for example the adjustment path, the adjustment angle, the position of an incremental position sensor or the like.

A control arrangement 7 is provided so as to control the drive arrangements 5. The control arrangement 7, in various embodiments, has control electronics for implementing the control tasks during the motorized adjustment. In various embodiments, the control arrangement 7 has an interior control unit 8, which communicates with a data server 9 via a communication network. The interior control unit 8 can in turn have multiple decentralized components, for example by way of drive control units that are assigned to the drive arrangements 5, and/or can be integrated in a central vehicle control unit. The control arrangement 7 can also be integrated into the motor vehicle 3 as a whole according to a configuration not shown here.

Figure 3:
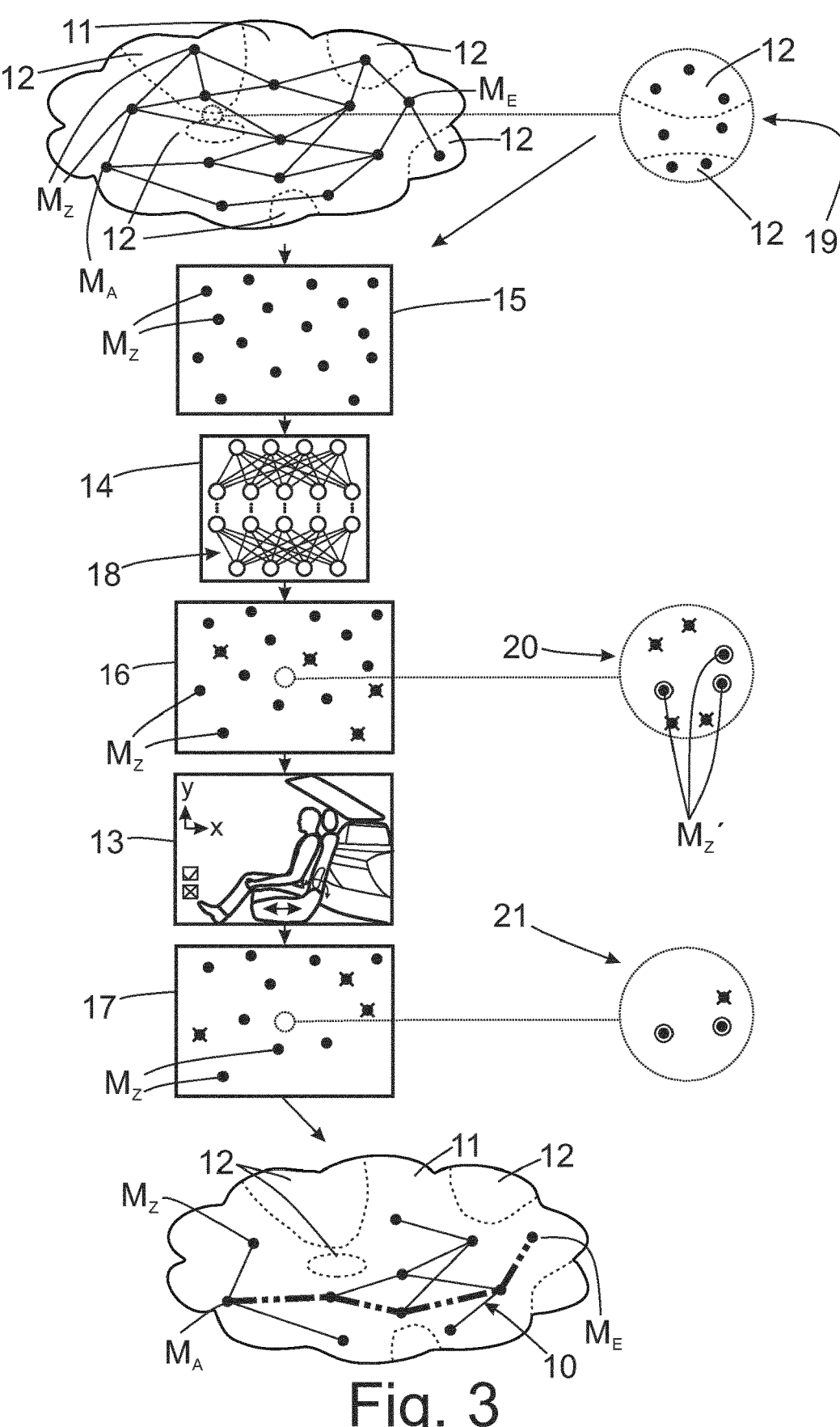
FIG. 3 shows a schematic flow chart of the path planning routine of the method according to the proposal.

A collision-free adjustment path 10 from an initial configuration $M_A$ to a final configuration $M_E$ is determined in a path planning routine by means of the control arrangement 7 by way of intermediate configurations $M_Z$, which is shown schematically in FIG. 3.

The initial configuration $M_A$ represents the configuration present at the start of the adjustment routine. The final configuration $M_E$ is the configuration that is to be achieved using the adjustment routine. Various initial configurations $M_A$ and final configurations $M_E$ are conceivable, for example an adjustment from an upright position of the seats to a reclined position, an adjustment from an alignment of the seats in the direction of travel to a configuration of the seats with the seats facing each other, folded or unfolded tables or the like.

Various adjustment paths by way of various intermediate configurations $M_Z$ are conceivable between the initial configuration $M_A$ and a final configuration $M_E$, wherein the configuration space 11 with various connection paths of the intermediate configurations $M_Z$ is shown by way of example in FIG. 3.

However, some of the intermediate configurations $M_Z$ and the connecting paths are collision-prone, wherein the approach of the respective configuration leads to contact or to falling below a predetermined minimum distance between the interior elements, in this case both between the motorized adjustable interior elements 5 and between the motorized adjustable interior elements 5 and static interior elements. In FIG. 3, collision areas 12 are shown schematically in the configuration space 11, wherein configurations within the collision areas 12 are collision-prone and therefore cannot be used for an adjustment.

In many cases, however, the collision areas 12 cannot be determined in advance with sufficient accuracy conclusively in the configuration space 11. In the present case, intermediate configurations $M_Z$ are proposed according to a path planning method. A collision check 13 is performed for the intermediate configurations $M_Z$, in which the respective intermediate configuration $M_Z$ is checked for the presence of a collision based on a kinematics model of the adjustment kinematics and a geometry model of the interior elements 5. The kinematics model depicts the behavior of the motorized adjustable interior elements 4 during the adjustment. The geometry model represents the spatial extent of the interior elements.

For example, at least part of the path planning routine, in particular the definition of new intermediate configurations $M_Z$, is performed in the configuration space 10, while the collision check 13 is performed at least partially in a working space in the interior 2. In the collision check 13, in particular the spatial extent of the interior elements can be modeled in the working space for the given intermediate configuration $M_Z$ and, for example, distance values between surfaces can be calculated.

As a result of the collision check 13, the respective intermediate configuration $M_Z$ is, in some embodiments, categorized as collision-free or collision-prone. The collision-free adjustment path 11 is generated based on the intermediate configurations and depending on the results of the collision check 13. The collision-free adjustment path thus represents a connecting path between the initial configuration $M_A$ and the final configuration $M_E$, which only runs by way of intermediate configurations $M_Z$ that are classified as collision-free in the collision check 13.

The control arrangement 7 controls the drive arrangements 5 in an adjustment routine in order to adjust the motorized adjustable interior elements 4 by way of the adjustment kinematics according to the collision-free adjustment path. The path planning routine can be performed before and/or during the adjustment routine.

Specifically, it is proposed that a prediction of the presence of a collision is generated for the intermediate configurations $M_Z$ by means of the control arrangement 7 with the aid of a predetermined collision estimation model 14 based on a trained machine learning model and that the intermediate configurations $M_Z$ are subjected to the collision check 13 or rejected depending on the prediction.

The prediction generated by the collision estimation model 14 can therefore be used to preselect the intermediate configurations $M_Z$. Intermediate configurations $M_Z$ that are collision-prone according to the prediction are rejected and thus not fed to the collision check 13. In particular, a prediction of the presence of a collision is generated for each of the intermediate configurations $M_Z$ and the respective intermediate configuration $M_Z$ is subjected to the collision check 13 or rejected depending on the prediction.

By designing the collision estimation model 14 as a trained machine learning model, a reliable prediction can be achieved even in the case of a complex, high-dimensional configuration space 11. At the same time, the computational effort required to use the collision estimation model 14 is low in many cases compared to the actual collision check 13 by way of the kinematics model and geometry model. In a simple embodiment, the collision estimation model 14 can perform a binary categorization of the respective intermediate configuration $M_Z$ (probably collision-free/probably collision-prone) or also specify a measure for the prediction, such as a collision probability, which serves as the basis for the decision as to whether the respective intermediate configuration $M_Z$ is subjected to the collision check 13 or not.

An exemplary sequence of the path planning routine is further illustrated in FIG. 3. In various embodiments, intermediate configurations $M_Z$ are generated based on a probabilistic path planning method. In various embodiments, the intermediate configurations $M_Z$ are generated using probabilistic methods with the addition of a bias, such as a preferred direction in the configuration space 11.

The intermediate configurations $M_Z$ can generally correspond to probabilistically generated nodes of the path planning method and/or also lie on connecting paths of the probabilistically generated nodes. FIG. 3 shows a compilation 15 of proposed intermediate configurations $M_Z$, here as nodes of the path planning method, which are generated probabilistically and fed to the collision estimation model 14. The connecting paths of the nodes can be checked in the same way.

Some of the proposed intermediate configurations $M_Z$ are categorized as collision-prone according to the prediction, since the collision estimation model 14, for example, assigns a comparatively high collision probability to these intermediate configurations $M_Z$. Such intermediate configurations $M_Z$ are rejected and a preselected compilation 16 of the remaining, proposed intermediate configurations $M_Z$ remains, which in turn are subjected to the collision check 13.

With the collision check 13, further intermediate configurations $M_Z$ from the preselected compilation 16 may be classified as collision-prone and rejected. An adjusted compilation 17 of collision-free intermediate configurations $M_Z$ is used to generate the collision-free adjustment path 10.

In addition to identifying a collision-free adjustment path 10, the path planning routine also allows the adjustment path 10 to be optimized for various possible alternatives. The collision-free adjustment path 10 can be optimized with regard to secondary conditions. An adjustment parameter to be optimized with the determination of the collision-free adjustment path 10 can be predetermined as a secondary condition in the path planning routine. Secondary conditions that are advantageous for operating comfort include, for example, minimizing the adjustment time and/or minimizing the adjustment path. The computing time to be used for the path planning routine can also be predetermined as a secondary condition, for example a maximum computing time within which the adjustment path 10 is to be optimized with regard to further secondary conditions. The collision-free adjustment path 10 generated can also be subjected to optimization, for example smoothing.

The collision-free adjustment path 10 can be determined on the basis of a rapidly exploring random tree (RRT) method and/or probabilistic roadmap (PRM) method. These path planning methods which have also been developed for autonomous navigation and robotics are advantageously applicable to the adjustment system 1 for a motor vehicle 3. Additionally or alternatively, it is possible to determine the collision-free adjustment path 10 based on a potential field method and/or a heuristic search method. A check for collisions of intermediate configurations $M_Z$ is performed here as described by way of a preselection by means of the collision estimation model 14 and the collision check 13.

According to various embodiments, the collision estimation model 14 is based on a trained neural network 18. However, other configurations of machine learning models are also conceivable.

As already mentioned, a collision probability of the intermediate configuration $M_Z$ can be determined with the aid of the collision estimation model 14. Based on the collision probability, for example with the aid of a predetermined function for the collision probability, a decision can be made as to whether the respective intermediate configuration is subjected to the collision check 13 or rejected. A distance measurement of interior elements can also be determined for the intermediate configuration with the aid of the collision estimation model 14, wherein a decision is made regarding whether to perform the collision check 13 based on the distance measurement, in particular based on a predetermined function of the distance measurement. The distance measurement can in particular include a geometric averaging of distance values and/or be predetermined on the basis of at least one predetermined point in the working space, for example on the basis of a minimum distance.

According to various embodiments, it is provided that at least one threshold value is predetermined for the collision probability and/or the distance measurement, and that the respective intermediate configuration $M_Z$ is subjected to the collision check 13 or rejected depending on whether the at least one threshold value is exceeded. The threshold values can be predetermined differently for different intermediate configurations $M_Z$. For example, respective threshold values are provided for different sections of the configuration space 11. In this way, different minimum distances can be mapped in particular for different configurations and interior elements.

According to a further embodiment, it is provided that multiple intermediate configurations $M_Z$ are generated, in particular in a predetermined section 19 of the configuration space. At least one of the intermediate configurations $M_Z$ is selected with the aid of the collision estimation model for the collision check 13. FIG. 3 shows by way of example a section 19 of the configuration space 11, which contains boundary areas of the collision areas 12. Here, the collision estimation model 14 can again be used in order to select particularly promising intermediate configurations $M_Z$ for the collision check 13, which is shown in section 20 of the configuration space in FIG. 3 on the basis of three selected intermediate configurations $M_Z'$. These intermediate configurations $M_Z'$ are subjected here to the collision check 13 and an adjusted compilation of intermediate configurations $M_Z'$ is generated in section 21.

In various embodiments, the at least one intermediate configuration $M_Z'$ is selected on the basis of an optimization of the collision probability and/or the distance measurement. For example, one or more intermediate configurations $M_Z'$ with the lowest collision probability and/or the highest distance measurement is selected from multiple proposed intermediate configurations $M_Z$.

Figure 4:
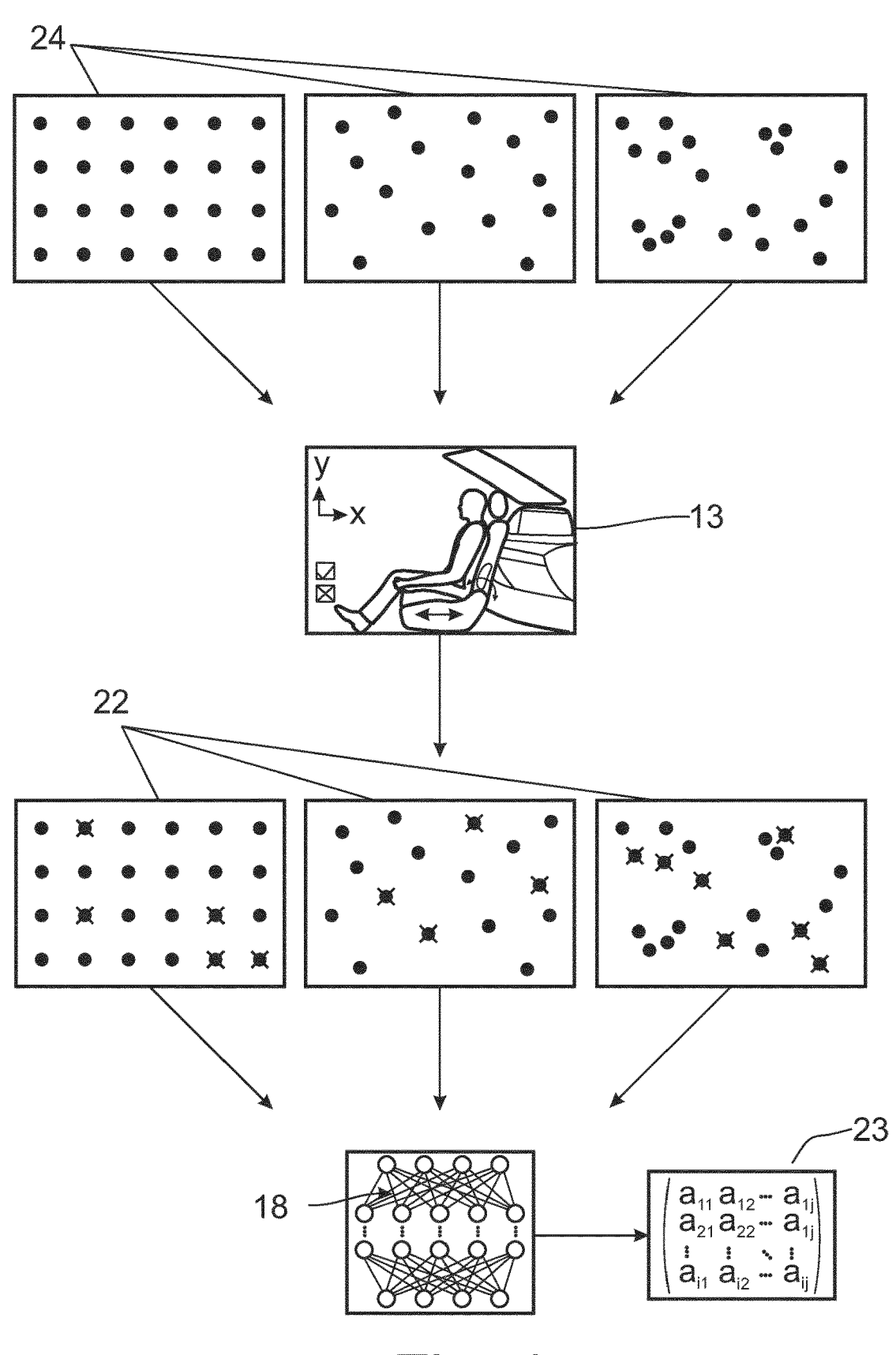
FIG. 4 shows a schematic diagram of the training step and the generation of the training data set.

According to various embodiments, the collision estimation model 14 is trained in a training step with the aid of a training data set 22, which is shown in FIG. 4.

In the example shown, the training data set 22 is a compilation of intermediate configurations $M_Z$, each of which is assigned, for example, the property "collision-free" or "collision-prone", a collision probability and/or a distance measurement. The neural network 18 is trained here with the aid of the training data set 22 and a parameter set 23 is generated, which is used as the basis for the collision estimation model 14.

The training step can advantageously be performed before the adjustment system 1 is commissioned, so that appropriate computing capacities can be provided for the training and, in particular, the computationally intensive generation of the training data set. Training during operation of the adjustment system 2 is also conceivable, wherein a pre-trained machine learning model can be trained further.

According to a further embodiment, it can be that the training data set is generated for a predetermined compilation 24 of intermediate configurations $M_Z$ on the basis of the performance of the collision check 13. The compilation 24 can be predetermined in various ways that are known per se, in particular for probabilistic path planning methods. FIG. 4 shows by way of example intermediate configurations $M_Z$ regularly distributed in the configuration space 11, intermediate configurations $M_Z$ randomly distributed in the configuration space 11, intermediate configurations $M_Z$ distributed with different densities. The intermediate configurations $M_Z$ of the compilation are subjected to the collision check 13 and the intermediate configurations $M_Z$ are annotated depending on the result of the collision check 13 in order to generate the training data set 22.

In principle, the method according to the proposal can be used for interiors 2 with different compilations of interior elements. It is also possible for interior elements to be added, exchanged and/or removed during operation of the motor vehicle 3. According to a further embodiment, the interior elements arranged in the interior 2 are identified in an identification routine by means of the control arrangement 7.

The identification can be performed by means of a detection of the interior elements by way of an interior sensor arrangement 25. For example, in one embodiment, the interior 2 is examined for the presence of various previously known interior elements by way of image recognition. Identification can also be performed by way of recognizing an electronic marker of the interior elements by means of the control arrangement 7. It is conceivable that the interior element is equipped with an electronic marker such as an RFID chip or the like, which is read by the control arrangement 7 in a wireless and/or cable-connected manner.

A change to the interior elements is taken into account here in the path planning routine. The control arrangement 7 can be used to select the collision estimation model 14 from multiple trained machine learning models for different arrangements of interior elements depending on the identification that has taken place. The kinematics model and/or geometry model can also be adapted.

According to a further embodiment, it is provided that in the collision check 13 a check is performed for a collision of the interior elements with each other and for a collision of the interior elements with objects 26 and/or persons 27 in the interior 2. The objects 26 and/or persons 27 are also mapped in the collision check 13 by way of the geometry model, for example. The objects 26 and/or persons 27 are detected here in the interior 2 by means of the interior sensor arrangement 25 and taken into account, for example, by means of a classification in the geometry model.

In this case, the interior sensor arrangement 25 can have at least one radar sensor, optical sensor, for example an imaging sensor such as a camera, in particular a ToF camera and/or 3D camera, an acoustic sensor, for example an ultrasonic sensor. The interior sensor arrangement 25 can also have a seat occupancy sensor, a capacitive sensor or the like, which enables conclusions to be drawn about the presence of an object in the interior 2.

According to a further teaching, a control arrangement 7 for operating an adjustment system 1 for an interior 2 of a motor vehicle 3 is provided as such.

What is essential here is that the control arrangement 7 with the aid of a predetermined collision estimation model 14 based on a trained machine learning model generates a prediction of the presence of a collision for the intermediate configurations $M_Z$ and that the control arrangement 7 subjects the intermediate configurations $M_Z$ to the collision check 13 or rejects them depending on the prediction. Reference is made to all statements relating to the method according to the proposal.

According to the further teaching, a motor vehicle 3 for performing a method according to the proposal is provided as such. Reference is also made to all the statements relating to the method according to the proposal.

According to a further teaching, a computer program product is provided. The computer program product has instructions which cause the control arrangement 7 according to the proposal to perform the described path planning routine. In various embodiments, the control arrangement 7 has a memory storage device in which the computer program product is stored and a processor for processing the instructions.

The computer program product has instructions which cause the motor vehicle according to the proposal to perform the method according to the proposal. Reference is made to all the above statements relating to the further teachings.

Furthermore, a computer-readable medium is provided on which the proposed computer program is stored, such as non-volatile.

The invention claimed is:

1. A method for operating an adjustment system for an interior of a motor vehicle, wherein the adjustment system has motorized adjustable interior elements, which can be adjusted between different configurations by respective drive arrangements having actuators by way of adjustment kinematics, wherein a collision-free adjustment path from an initial configuration to a final configuration is determined in a path planning routine by means of the control arrangement by way of intermediate configurations, wherein a collision check is performed for the intermediate configurations, in which the respective intermediate configuration is checked for the presence of a collision based on a kinematics model of the adjustment kinematics and a geometry model of the interior elements, wherein the collision-free adjustment path is generated based on the intermediate configurations and depending on the results of the collision check, wherein the control arrangement controls the drive arrangements in an adjustment routine in order to adjust the motorized adjustable interior elements by way of the adjustment kinematics according to the collision-free adjustment path, wherein a prediction of the presence of a collision is generated for the intermediate configurations by means of the control arrangement with the aid of a predetermined collision estimation model based on a trained machine learning model and wherein the intermediate configurations are subjected to the collision check or rejected depending on the prediction.

2. The method as claimed in claim 1, wherein the intermediate configurations are generated based on a probabilistic path planning.

3. The method as claimed in claim 2, wherein the intermediate configurations are determined on the basis of a rapidly exploring random tree method and/or probabilistic roadmap method.

4. The method as claimed in claim 2, wherein the intermediate configurations correspond to probabilistically generated nodes of the path planning method and/or lie on connecting paths of the probabilistically generated nodes.

5. The method as claimed in claim 1, wherein the collision estimation mode based on a trained neural network.

6. The method as claimed in claim 1, wherein a collision probability of the intermediate configuration is determined with the aid of the collision estimation model and/or wherein a distance measurement of interior elements is determined for the intermediate configuration with the aid of the collision estimation model.

7. The method as claimed in claim 6, wherein at least one threshold value is predetermined for the collision probability and/or the distance measurement, and wherein the respective intermediate configuration is subjected to the collision check or rejected depending on whether the at least one threshold value is exceeded.

8. The method as claimed in claim 7, wherein respective threshold values are provided for different sections of a configuration space.

9. The method as claimed in claim 1, wherein multiple intermediate configurations are generated, and at least one of the intermediate configurations is selected with the aid of the collision estimation model for the collision check.

10. The method as claimed in claim 9, wherein the at least one intermediate configuration is selected on the basis of an optimization of a collision probability and/or the distance measurement.

11. The method as claimed in claim 1, wherein the collision estimation model is trained in a training step by way of a training data set.

12. The method as claimed in claim 11, wherein the training data set is generated for a predetermined compilation of intermediate configurations on the basis of the performance of the collision check.

13. The method as claimed in claim 11, wherein the training step is performed before the adjustment system is commissioned or during the operation of the adjustment system.

14. The method as claimed in claim 1, wherein the interior elements arranged in the interior are identified in an identification routine by means of the control arrangement and wherein the collision estimation mode is selected by means of the control unit from multiple trained machine learning models for different arrangements of interior elements depending on the identification that has taken place.

15. The method as claimed in claim 1, wherein in the collision check a check is performed for a collision of the interior elements with each other and for a collision of the interior elements with objects and/or persons in the interior.

16. The method as claimed in claim 15, wherein the objects and/or persons in the interior are detected by an interior space arrangement.

17. A motor vehicle for performing a method as claimed in claim 1.

18. A control arrangement for operating an adjustment system for an interior of a motor vehicle, wherein the adjustment system has motorized adjustable interior elements, which can be adjusted between different configurations by respective drive arrangements having actuators by way of adjustment kinematics, wherein the control arrangement determines in a path planning routine a collision-free adjustment path from an initial configuration to a final configuration by way of intermediate configurations, wherein the control arrangement performs for the intermediate configurations a collision check in which the respective intermediate configuration is checked for the presence of a collision based on a kinematics model of the adjustment kinematics and a geometry model of the interior elements, wherein the control arrangement generates the collision-free adjustment path based on the intermediate configurations and depending on the results of the collision check, wherein the control arrangement controls the drive arrangements in an adjustment routine in order to adjust the motorized adjustable interior elements by way of the adjustment kinematics according to the collision-free adjustment path, wherein the control arrangement with the aid of a predetermined collision estimation model based on a trained machine learning model generates a prediction of the presence of a collision for the intermediate configurations and wherein the control arrangement subjects the intermediate configurations to the collision check or rejects them depending on the prediction of the collision check.

19. A non-transitory computer readable medium containing a computer program product, comprising instructions which cause a control arrangement as claimed in claim 18 to determine in a path planning routine a collision-free adjustment path from an initial configuration to a final configuration by way of intermediate configurations, wherein the control arrangement performs for the intermediate configurations a collision check in which the respective intermediate configuration is checked for the presence of a collision based on a kinematics model of the adjustment kinematics and a geometry model of the interior elements, wherein the control arrangement generates the collision-free adjustment path based on the intermediate configurations and depending on the results of the collision check, wherein the control arrangement controls the drive arrangements in an adjustment routine in order to adjust the motorized adjustable interior elements by way of the adjustment kinematics according to the collision-free adjustment path, wherein the control arrangement generates a prediction of the presence of a collision for the intermediate configurations with the aid of a predetermined collision estimation model based on a trained machine learning model and wherein the control arrangement subjects the intermediate configurations to the collision check or rejects them depending on the prediction.

* * * * *